United States Patent
Xu et al.

(10) Patent No.: US 8,136,001 B2
(45) Date of Patent: Mar. 13, 2012

(54) TECHNIQUE FOR INITIALIZING DATA AND INSTRUCTIONS FOR CORE FUNCTIONAL PATTERN GENERATION IN MULTI-CORE PROCESSOR

(75) Inventors: Kun Xu, Austin, TX (US); Jen-Tien Yen, Austin, TX (US); Robert Serphillips, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 221 days.

(21) Appl. No.: 12/479,535

(22) Filed: Jun. 5, 2009

(65) Prior Publication Data

US 2010/0313092 A1    Dec. 9, 2010

(51) Int. Cl.
*G01R 31/28*    (2006.01)
(52) U.S. Cl. .......................................... 714/724; 714/726
(58) Field of Classification Search .................... None
See application file for complete search history.

(56) References Cited

U.S. PATENT DOCUMENTS

| | | | | |
|---|---|---|---|---|
| 4,482,953 | A | * | 11/1984 | Burke .............................. 714/27 |
| 4,553,201 | A | * | 11/1985 | Pollack, Jr. ...................... 714/46 |
| 4,933,941 | A | * | 6/1990 | Eckard et al. .................... 714/31 |
| 5,617,531 | A | | 4/1997 | Crouch et al. |
| 5,940,588 | A | * | 8/1999 | Kikinis ............................ 714/28 |
| 5,961,653 | A | * | 10/1999 | Kalter et al. ....................... 714/7 |
| 6,249,889 | B1 | | 6/2001 | Rajsuman et al. |
| 6,631,086 | B1 | * | 10/2003 | Bill et al. .................. 365/185.09 |
| 6,643,804 | B1 | * | 11/2003 | Aipperspach et al. ........ 714/718 |
| 6,948,096 | B2 | | 9/2005 | Parvathala et al. |
| 7,093,174 | B2 | | 8/2006 | Fenech Saint Genieys |
| 7,653,845 | B2 | * | 1/2010 | Hesse et al. .................... 714/718 |
| 2004/0216061 | A1 | | 10/2004 | Floyd et al. |
| 2005/0240850 | A1 | | 10/2005 | Ohwada et al. |
| 2006/0236185 | A1 | | 10/2006 | Baker |
| 2006/0265632 | A1 | | 11/2006 | Huang et al. |
| 2007/0260950 | A1 | * | 11/2007 | Morrison et al. ............. 714/726 |

OTHER PUBLICATIONS

Krstic, A. et al. Embedded Software-Based Self-Testing for SoC design, DAC Jun. 10-14, 2002, pp. 355-360.

* cited by examiner

*Primary Examiner* — Jeffrey A Gaffin
*Assistant Examiner* — Steve Nguyen
(74) *Attorney, Agent, or Firm* — Zagorin O'Brien Graham LLP

(57) ABSTRACT

Techniques have been developed to introduce processor core functional pattern tests into a memory space addressable by at least one processor core of an integrated circuit. In general, such functional pattern tests can include both instruction sequences and data patterns and, in some embodiments in accordance with the present invention, are introduced (at least in part) into on-chip cache memory using facilities of an on-chip loader. Instruction opcodes used in functional test sequences may be efficiently introduced into a plurality of target locations in memory (e.g., at locations corresponding to multiple interrupt handlers or at locations from which a multiplicity of cores execute their functional tests) using facilities of the on-chip loader. In some embodiments, instruction selections together with a base address, extent and stride indications may be used to direct operation of the on-chip loader. Likewise, data patterns used in the functional test sequences may be specified as a data pattern selection together with base address, extent and optional stride indications and introduced into a plurality of target memory locations using facilities of the on-chip loader. In some embodiments, other forms or encodings of directives may be used.

22 Claims, 5 Drawing Sheets

TECHNIQUE FOR INITIALIZING DATA AND INSTRUCTIONS FOR CORE FUNCTIONAL PATTERN GENERATION IN MULTI-CORE PROCESSOR

BACKGROUND

1. Field

This disclosure relates generally to testing of processor integrated circuits, and more specifically, to techniques for efficiently introducing instructions and data for core functional pattern tests.

2. Related Art

Modern multi-core processor designs can include numerous processor cores operating at high frequencies. Complex on-chip interconnect micro-architectures have been developed, in part, to achieve high bandwidth and/or low latencies in communications amongst such processor cores, memory and other devices in system on chip (SoC) designs. Unfortunately, compared to the operating frequencies, data transfer bandwidths and latencies achievable using such technologies, input/output (I/O) interfaces available or dedicated to test are typically slow and exhibit low bandwidth and high latency. This performance gap can make conventional external-tester-driven test strategies awkward and/or ineffective for at-speed testing of complex SoC and multi-core processor designs.

As a result, embedded software-based self-testing strategies have gained popularity. These strategies generally assume that processors or programmable cores can first be self-tested by running thereon synthesized test programs that achieve high fault coverage. Next, a processor or programmable core is itself used as a functional pattern generator and response analyzer to test on-chip interconnects, interfaces amongst cores, and even other cores including digital, mixed-signal or analog components of an SoC design. This strategy is sometimes referred to as functional pattern testing.

Unfortunately, just as the performance gap between processor cores and interconnects (on the one hand) and I/O interfaces available or dedicated to test (on the other) complicates conventional external-tester-driven test, such performance gaps can likewise complicate the process of introducing (e.g., through scan logic or other I/O facility) the very test programs and related data that define core functional pattern tests. As a result, the process of introducing instructions and data patterns for the core functional pattern tests can itself be quite time consuming. Worse still, it is generally desirable to generate functional patterns for each processor or core. Accordingly, challenges that are significant even for a single processor or core tend to scale dramatically when the introduction of instructions and data patterns for a multiplicity of processors or cores is considered.

Conventional techniques whereby individual instructions and data for functional patterns are scanned directly from I/O or test interfaces to targets in memory may be undesirable or just plain inadequate. Improved techniques are desired.

BRIEF DESCRIPTION OF THE DRAWINGS

The present invention is illustrated by way of example and not limitation with reference to the accompanying figures, in which like references generally indicate similar elements or features.

Figure 1:
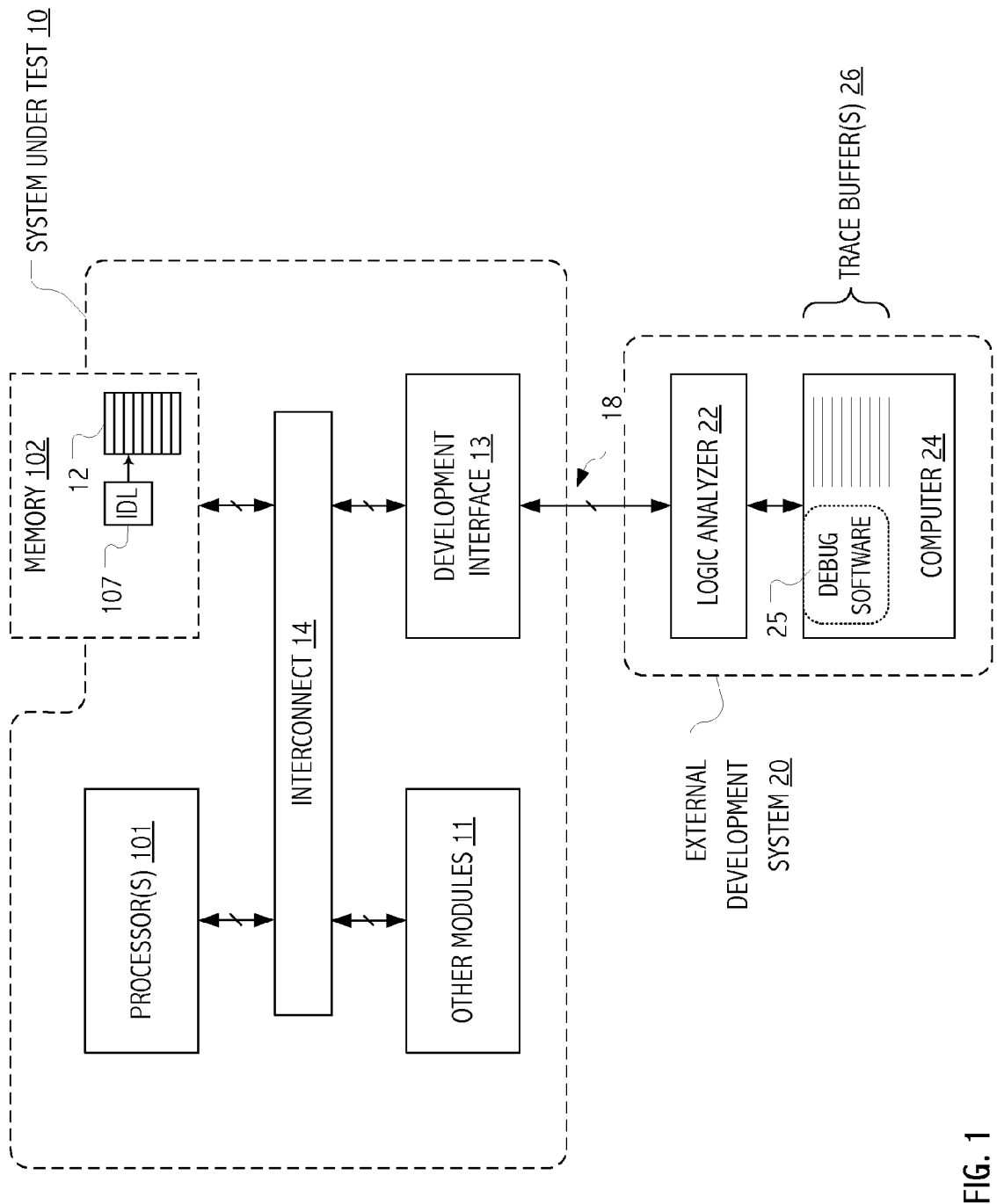
FIGS. 1 and 2 are block diagrams of respective computational systems in which initialization of processor core functional pattern test is provided using on-chip loader techniques in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DETAILED DESCRIPTION

Techniques have been developed to introduce processor core functional pattern tests into a memory space addressable by at least one processor core of an integrated circuit. In general, such functional pattern tests can include both instruction sequences and data patterns and, in some embodiments in accordance with the present invention, are introduced (at least in part) into on-chip cache memory using facilities of an on-chip loader. Instruction opcodes used in functional test sequences may be efficiently introduced into a plurality of target locations in memory (e.g., at locations corresponding to multiple interrupt handlers or at locations from which a multiplicity of cores execute their functional tests) using facilities of the on-chip loader. In some embodiments, instruction selections together with a base address, extent and stride indications may be used to direct operation of the on-chip loader. Likewise, data patterns used in the functional test sequences may be specified as a data pattern selection together with base address, extent and optional stride indications and introduced into a plurality of target memory locations using facilities of the on-chip loader. In some embodiments, other forms or encodings of directives may be used.

In some embodiments or situations, frequently used opcodes and/or data patterns may be selected from amongst predefined values encoded on-chip (e.g., in non-volatile or power-on initialized storage or in fixed logic) for introduction into target memory locations. In some embodiments or situations, individual opcodes and/or data patterns may be scanned or otherwise introduced into temporary storage (e.g., registers) local to the on-chip loader and selected therefrom for introduction into target memory locations.

In each case, the selections and memory targets are supplied (e.g., via scan logic or other I/O facility) to on-chip loader as directives that, when effectuated by the on-chip loader, efficiently introduce corresponding instruction opcodes and/or data patterns into corresponding pluralities of target memory locations. The directives, which are comparatively compact, can be transacted over scan logic or I/O channels, while the on-chip loader performs the corresponding series of memory write operations that effectuate the directives. In some embodiments, the on-chip loader is co-located with on-chip cache memory and directly introduces instruction and/or data pattern selections into addressable locations of the on-chip cache memory. In some cases, the multiplicity of target locations for a single directive can be quite large and the efficiencies achieved can be dramatic.

In some embodiments, a method of introducing processor core functional tests into a memory space addressable by least one processor core of a system on a chip (SoC) integrated circuit includes (i) scanning data pattern target and data pattern selection information from off-chip into respective fields of control registers of an on-chip loader and (ii) scanning at least a first data pattern from off-chip into on-chip data pattern storage accessible by the on-chip loader. Under control of the on-chip loader, data pattern information is written to a first set of plural data locations in the addressable memory space, wherein the data patterns written and the written-to data locations of the first set are respectively selected based on the data pattern target and the data pattern selection information scanned from off-chip. At least one of the selected data patterns corresponds to the first data pattern and is sourced from the on-chip data pattern storage. In some embodiments, the method further includes scanning at least instruction target and instruction selection information from off-chip into respective fields of the control registers of the on-chip loader and, under control of the on-chip loader, writing instructions to a second set of plural instruction locations in the addressable memory space. The instructions written and the written-to instruction locations of the second set are respectively selected based on the instruction target and instruction selection information scanned from off-chip.

In some embodiments, an apparatus includes a processor core suitable for executing instruction sequences from, and addressing data in, memory; an on-chip cache coupled between the processor core and an interface to the memory; and an on-chip functional test loader. The on-chip functional test loader is coupled to introduce, based on data pattern target and data pattern selection information scanned from off-chip into respective fields of control registers, at least a first portion of a core functional test into the on-chip cache, wherein the introduced first portion of the core functional test includes at least a first data pattern scanned from off-chip into on-chip data pattern storage accessible by the on-chip functional test loader. In some embodiments, the apparatus further includes content selection logic and cache pointer logic of the on-chip functional test loader. The content selection logic is responsive to a data pattern selection field of the control registers. The cache pointer logic is responsive to one or more data pattern target fields of the control registers and to a state machine operable to advance a cache pointer to identify successive locations of the on-chip cache into which a selected data pattern is to be introduced.

In some embodiments, a method of introducing processor core functional tests into a memory space addressable by at least one processor core of a system on a chip (SoC) integrated circuit includes (i) scanning both data pattern targets and data pattern selections from off-chip into first respective fields of control registers of an on-chip loader; (ii) scanning both instruction targets and opcode selections from off-chip into second respective fields of the control registers of the on-chip loader; and (iii) under control of the on-chip loader, writing data patterns and opcodes to respective data and instruction locations in the addressable memory space. The data patterns written and the written-to data locations are selected based on the data pattern targets and the data pattern selections scanned from off-chip. Likewise, the opcodes written and the written-to instruction locations are selected based on the instruction targets and instruction selections scanned from off-chip.

For some applications, systems and/or processor implementations, such techniques (or variations thereon) can be used to introduce data patterns for processor core functional tests across large swaths of memory. Similarly, such techniques (or variations thereon) can be used to introduce instruction sequences that are used repeatedly in the test programs executed by processor cores. Specific instruction sequences used repeatedly will (in general) be application dependent; however, examples include code replicated at a multiplicity of entry points or interrupt handler vectors as well as code introduced into the address spaces of multiple processes or processor cores. In such cases, significant portions of the test programs and/or their associated in memory data may be introduced at memory access speeds unencumbered by bandwidth limitations of conventional scan logic or other I/O facilities. Of course, in some applications or test environments, some portions of a test program may nonetheless be introduced via scan logic or I/O channel. However, even in such applications or environments, delegation of a substantial portion of the "heavy lifting" to an on-chip loader can improve the overall efficiency of test program introduction.

For concreteness of description, we focus on certain illustrative SoC integrated circuits and memory organizations and on certain illustrative instructions and data patterns that may be efficiently introduced into addressable memory. For example, in much of the description herein, addressable locations in an on-chip cache are the primary targets for data patterns and/or instructions introduced by an on-chip data loader and main memory need not reside on chip or be employed. Likewise, simple examples of interrupt handler code and data patterns that may be replicated in addressable memory are used as part of a processor core functional pattern test. Of course, embodiments of the present invention are not limited to the integrated circuit designs, memory organizations or illustrated types of functional pattern tests. Rather, techniques described herein have broad applicability to computational systems in which it is desirable or useful to efficiently introduce any of a variety of processor core functional pattern tests into addressable storage. Accordingly, in view of the foregoing and without limitation on the range of memory models, processor or computational system architectures or test applications thereof that may be employed, we describe certain illustrative embodiments.

Systems and Integrated Circuit Realizations, Generally

FIG. 1 illustrates a computational system under test 10 in which an on-chip instruction and data loader (IDL) 107 is provided for introducing opcode and data pattern constituents of processor core functional tests into addressable memory locations. Aside from IDL 107 (which is described in greater detail below), processors 101, memory 102, on-chip interconnect 14 (which, in some embodiments may be a bus-type interconnect), and other modules 11 are of any conventional or otherwise suitable design. In the illustrated configuration, at least processors(s) 101, interconnect 14 and some storage corresponding to memory 102 reside on-chip. Typically, memory control circuits and at least a portion of the storage associated with an address space (e.g., a cached or otherwise addressable subportion 12) reside on-chip while banks of main memory (not specifically shown) may be provided off-chip. Accordingly, the on-chip cache memory or otherwise addressable subportion provide a useful locus for instruction and data loader support. Other modules 11 typically include at least the on-chip portions of an input/output (I/O) subsystem including, where appropriate, I/O bridges, direct memory access (DMA) controllers and/or I/O devices themselves.

An illustrative development interface 13 couples between the on-chip interconnect 14 and ordinarily presents pins or some other suitable terminal interface(s) 18 in accord with an agreed interface standard such as IEEE-ISTO 5001™ (Nexus) and/or IEEE 1149.1 joint test action group (JTAG). In general, any of a variety of implementations of development interface 13 is acceptable and persons of ordinary skill in the art will appreciate numerous suitable implementations that provide the auxiliary pin functions, transfer protocols, scan interfaces and/or development features specified for such an agreed standard. While a proprietary interface could also be acceptable, a standardized test interface is generally preferred. IEEE-ISTO 5001 is a trademark of the IEEE Industry Standards and Technology Organization.

Whatever the configuration and selection of development interface 13 (and terminal interface(s) 18 thereto), support is provided for at least a subset of the ordinary debugger-, logic analyzer-, data acquisition-, prototyping- and/or run-time parameter tuning-related data transfers and functional triggering capabilities of modern test environments, including those related to read and/or write (e.g., scan-type) access to internal resources of system under test 10, program, data, and bus tracing, etc. That said, for purposes of this description of embodiments of the present invention, other than conventional support for scan-type transfers, additional capabilities (while useful) are largely irrelevant.

In one embodiment, external development system 20 includes a logic analyzer 22 with trace probes coupled to a computer 24. The computer 24 hosts debug software 25 and includes storage usable as trace buffers 26 to receive results of processor core functional pattern tests. Although computer 24 and debug software 25 may provide design and test engineers with any of a variety of features and capabilities, for purposes of this description of embodiments of the present invention, the salient point is that computer 24 hosts debug software 25 that can be employed to initiate transfers of appropriate directives (including e.g., data pattern targets and selections and/or instruction targets and opcode selections) from off-chip into control registers of IDL 107.

Figure 2:
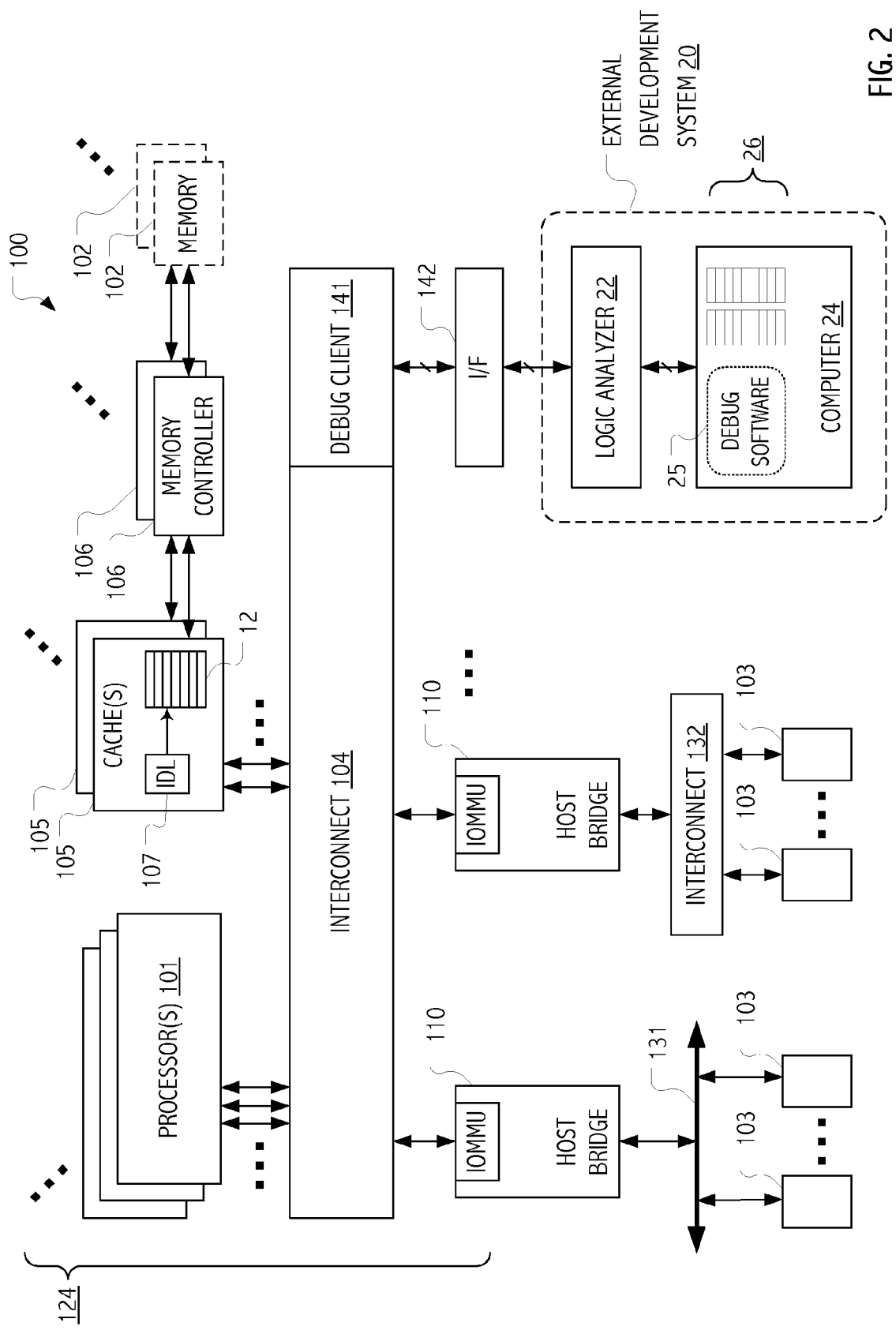

FIG. 2 illustrates a somewhat more complex computational system 100 in which processors 101, memory 102 and I/O devices 103 are coupled by an interconnect 104. Although any of a variety of memory hierarchies may be employed, FIG. 2 illustrates a configuration in which at least some level of cache 105 is interposed between interconnect 104 and memory 102 (and associated memory controllers 106). In some embodiments, caches 105 are configured as L3 cache and represent state that spans the data and instruction spaces of processors 101, while additional levels of L1 and L2 cache (not separately shown) are collocated with individual processors or processor cores. An on-chip instruction and data loader (IDL) 107 is provided for introducing opcode and data pattern constituents of processor core functional tests into addressable memory locations (shown collectively as 12) within caches 105 based on directives supplied from off-chip. Processors 101 then execute the processor core functional tests, including the introduced opcodes and data patterns.

In the illustrated configuration, interconnect 104 includes a scalable on-chip network that is suitable for interconnecting multiple processor cores with memory and I/O subsystems. Processors 101 are linked to each other, to memory 102 and to host bridges 110 via the interconnect 104 and, in some embodiments, interconnect 104 implements a modern frontside multi-path interconnect fabric that supports concurrent non-conflicting transactions and high data rates. Any of a variety of interconnect topologies and physical-layer, datalink and transaction layer protocols may be implemented; however, in general, interconnect 104 presents each of the system components coupled at ports thereof with a coherent view of memory state and provides coherency related semantics for split address and data transactions consistent with a coherence model that specifies interactions with devices, states maintained, state transitions and actions necessary to achieve coherent behavior.

Coherency domain 124 spans the collection of memory subsystems including memory 102 and caches (e.g., the illustrated L2/L3 caches 105 and any other caches or lookaside stores), processors 101, interconnect 104, and I/O host bridges 110 that cooperate through relevant protocols to meet memory coherence, consistency, ordering, and caching rules specific to a platform architecture. For example, in some embodiments, coherency domain 124 conforms to coherence, consistency and caching rules specified by Power Architecture™ technology standards as well as transaction ordering rules and access protocols employed in a CoreNet™ interconnect fabric. Power Architecture is a trademark of Power-.org and refers generally to technologies related to an instruction set architecture originated by IBM, Motorola (now Freescale Semiconductor) and Apple Computer. CoreNet is a trademark of Freescale Semiconductor, Inc.

A substantial portion of the computational system illustrated in FIG. 2 is implemented as a system on a chip (SoC) and embodied as a single integrated circuit chip. In such configurations, memory and/or a subset of I/O devices or interfaces may be implemented on- or off-chip, while the substantial entirety of illustrated blocks are packaged as an SoC. However, in other embodiments and more generally, portions of computational system 100 may be implemented in or as separate integrated circuits in accord with design, packaging or other requirements.

Interface 142 couples an on-chip debug client 141 out to an external (off-chip) development system that is capable of supplying directives (including e.g., data pattern targets and selections and/or instruction targets and opcode selections) into control registers of IDL 107 and, as before, presents pins or some other suitable terminal interface(s) in accord with an agreed interface standard such as IEEE-ISTO 5001 (Nexus) or IEEE 1149.1 joint test action group (JTAG). As before, illustrated external development system 20 includes a logic analyzer 22 coupled to a computer 24 that hosts debug software 25. Debug software 25 is of any suitable and/or commercially reasonable design.

In the illustrated configuration, I/O devices 103 do not connect directly to primary processor busses, but rather via respective host bridges 110 that, in the illustrated configuration, include I/O Memory Management Units (IOMMUs). In general, any given I/O device 103 attaches to an I/O interconnect, such as PCI Express, AXI or other interconnect technology, and has a set of resources appropriate to its function. For generality, bus-type interconnects 131, multiplexed interconnects 132 and mixed-type interconnect configurations 133 are all illustrated. Operations that involve an I/O device 103 may include storage operations initiated from within coherency domain 124 which cross the coherency domain boundary, storage operations initiated from outside coherency domain 124 that target storage (e.g., memory 102) within the coherency domain, and storage operations initiated outside coherency domain 124 that target storage that is also outside the coherency domain.

Although external development system 20 and interface 142 have been illustrated as a primary pathway by which directives (including e.g., data pattern targets and selections and/or instruction targets and opcode selections) may be scanned to IDL 107, persons of ordinary skill in the art will appreciate that any of a variety of I/O device 103 may also (or in the alternative) be employed in (or as part of) a pathway for supply of directives to IDL 107.

Instruction and Data Loader

Figure 3:
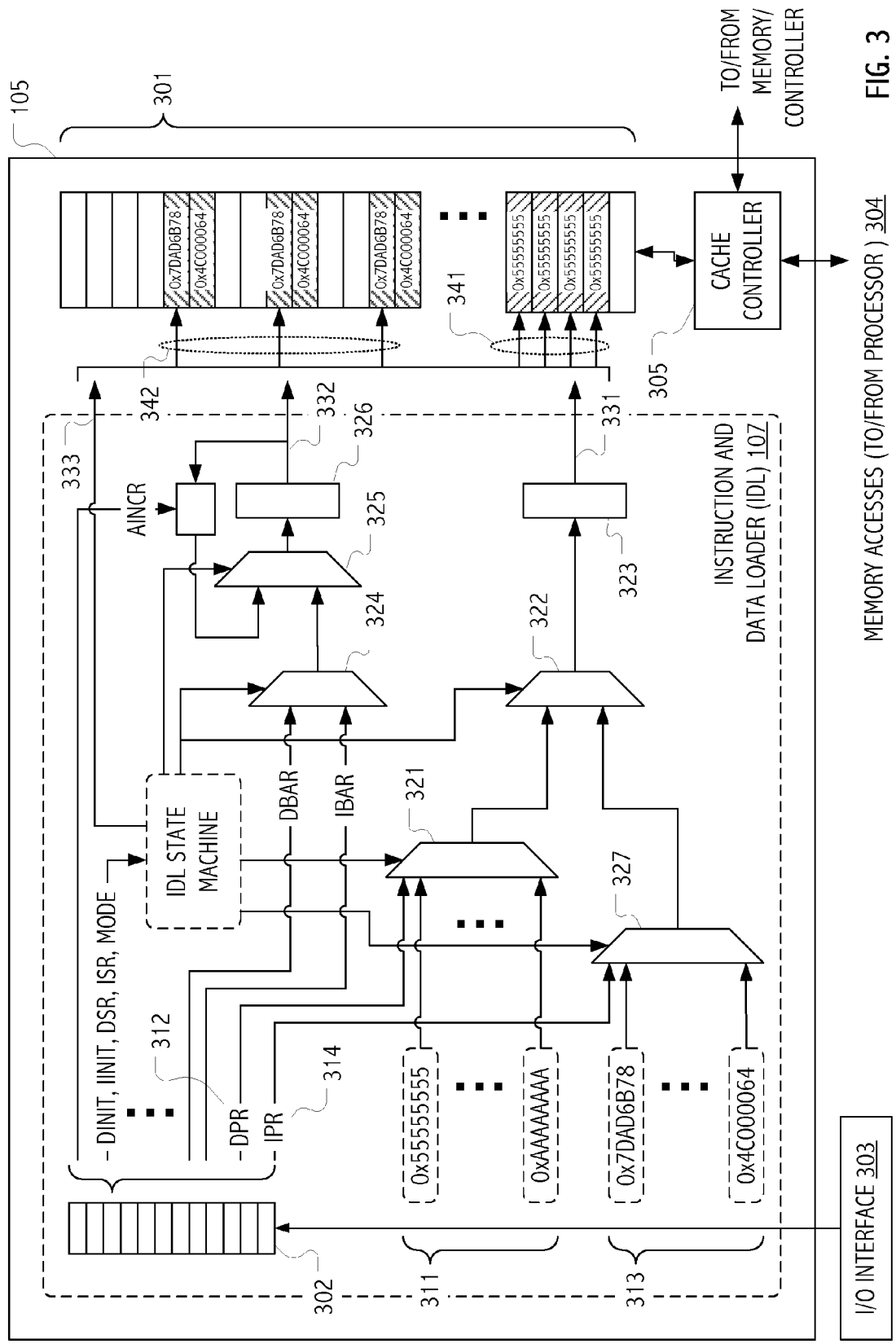
FIG. 3 is block diagram of an instruction and data loader in accordance with some embodiments of the present invention and resident with an on-chip cache memory.

Building on the foregoing, FIG. 3 depicts an illustrative implementation of instruction and data loader (IDL) 107. Although the design and operation of IDL 107 will be understood in the context of any of a variety of computation systems, much of the description that follows is consistent with the illustration of FIG. 2 in which IDL 107 is integrated with on-chip cache memory 105. Accordingly, in the illustration of FIG. 3, locations 301 in on-chip cache memory 105 are the ultimate target of directives scanned to configuration registers 302 of IDL 107 from a test or I/O interface 303. Once opcodes and data patterns have been introduced into locations 301, functional test sequences so defined may be executed by a processor core (not specifically shown in FIG. 3) directly from on-chip cache memory 105. That is, instruction sequences of the functional pattern test may be fetched directly from on-chip cache memory 105 and locations in on-chip cache memory 105 containing initialized data patterns may be accessed directly in the course of read and write operations of the functional pattern test. In this regard, memory accesses 304 by a processor core are mediated by a conventional cache controller 305 that controls accesses and data transfers to and from locations 301 in accord with an implemented memory coherence model and hierarchy of stores. Persons of ordinary skill in the art will appreciate adaptations to other systems and configurations.

Using facilities of IDL 107, opcodes and data patterns can be introduced into locations 301 of on-chip cache memory 105 without a direct scan-type path from external pins (or external I/O interface). Instead, directives are scanned via I/O interface 303 into configuration registers 302. IDL 107 is then directed (typically by scanning an initiation trigger to configuration registers 302) to initialize instruction and/or data contents of on-chip cache memory 105 in accordance therewith. For example, prior to execution of functional pattern test cases, IDL 107 loads constituent opcodes for common routines (such as interrupt service routines) into respective locations of on-chip cache memory 105. The opcodes so introduced and the locations at which such opcodes are introduced are specified using directives scanned to configuration registers 302. Likewise, IDL 107 loads data patterns into respective locations of on-chip cache memory 105. The data patterns so introduced and the locations at which such data patterns are introduced are again specified using directives scanned to configuration registers 302. Together, the opcodes and data patterns so introduced at least partially define functional pattern tests executable on one or more of the processor cores. On-chip cache memory 105 is configured to respond to read/write accesses 304 (within at least a supported address range) without regard to contents of main memory and processor cores that execute the functional pattern tests directly from on-chip cache memory 105.

In the illustrated configuration, configuration registers 302 include fields pertinent to introduction of data patterns as well as fields pertinent to introduction of opcode sequences. For example, a data initialization space base address register (DBAR) and a data initialization size register (DSR) together define the extent of a region of addressable memory into which a selected data pattern is to be introduced. In general, the particular data pattern to be introduced may be selected from amongst a set 311 of predefined values encoded on-chip (e.g., in non-volatile or power-on initialized storage or in fixed logic) and/or, in the illustrated configuration, from at least one arbitrary, scan-loadable value 312 in a data pattern register (DPR). In general, any pertinent set of predefined values may be supported; however, values such as 0x55555555, 0xAAAAAAAA, 0x00000000 and 0xFFFFFFFF are typical. Contents of a mode field (MODE) are used to select from amongst the alternatives. In general, an address increment may be specified (e.g., using contents of an address increment field, AINCR) to establish a stride through memory at which the selected data pattern is introduced or a fixed (e.g., 32-bit word increment) may be implicit.

Likewise with respect to the introduction of opcode sequences, an instruction initialization base address register (IBAR) and an instruction initialization size register (ISR) together define the extent of a region of addressable memory into which a selected opcode is to be introduced. In general, the particular opcode to be introduced may be selected from amongst a set 313 of predefined values encoded on-chip (e.g., in non-volatile or power-on initialized storage or in fixed logic) and/or, in the illustrated configuration, from at least one arbitrary, scan-loadable value 314 in an instruction opcode register (IPR). Contents of the mode field (MODE) can be used to select from amongst the alternatives. In general, any pertinent set of predefined values may be supported; however, for purposes of illustration, opcodes employed at successive instruction positions in replicated interrupt handler stubs (e.g., opcodes 0x7DAD6B78 and 0x4C000064) are reasonable candidates. As before, an address increment may be specified (e.g., using contents of an address increment field, AINCR) to establish a stride through memory at which the selected opcode is introduced.

In the illustrated configuration, data and instruction initialization triggers (and IINIT) are themselves scan loadable and cause IDL state machine 306 to control relevant mux selects and to successively increment a write pointer 332 into locations 301 of on-chip cache memory 105 so as to introduce the selected data pattern or instruction opcode at successive positions beginning at a base address (as specified by DBAR or IBAR) at an operant stride (AINCR, if specified). Thus, responsive to a DINIT trigger, IDL state machine 306 drives mux select signals to select a particular data pattern, e.g., 0x55555555 from amongst the inputs presented at multiplexer 321 and to couple the selected value through multiplexer 322 to latch 323 as write data 331 for addressed locations in on-chip cache memory 105. During an initial iteration, IDL state machine 306 drives mux select signals at multiplexers 324, 325 to select the data pattern base address (as specified by DBAR) and couple a corresponding value through to latch 326 as write pointer 332. During successive iterations, IDL state machine 306 drives the mux select signal at multiplexer 325 to couple an incremented pointer value through to latch 326 as write pointer 332. Write enable 333 is asserted for each successive introduction (341) of the selected data pattern, here, 0x55555555.

Similarly, responsive to an IINIT trigger, IDL state machine 306 drives mux select signals to select a particular opcode, e.g., 0x7DAD6B78 from amongst the inputs presented at multiplexer 327 and to couple the selected value through multiplexer 322 to latch 323 as write data 331 for addressed locations in on-chip cache memory 105. During an initial iteration, IDL state machine 306 drives mux select signals at multiplexers 324, 325 to select the instruction base address (as specified by IBAR) and to couple a corresponding value through to latch 326 as write pointer 332. During successive iterations, IDL state machine 306 drives the mux select signal at multiplexer 325 to couple an incremented pointer value through to latch 326 as write pointer 332. In the illustration of FIG. 3, write enable 333 is asserted for each successive introduction (342) of the selected opcode, here, 0x7DAD6B78 at a stride AINCR=4.

In general, opcodes and data patterns so introduced are written to on-chip cache memory 105 before processor cores are given grants to start fetching instructions. In embodiments such as illustrated in FIG. 3, opcodes and data patterns are written to on-chip cache memory 105 at frequencies and latencies approaching (at least for bursts of successive opcode or data pattern introductions) those supported for cache memory accesses. In embodiments that place IDL 107 elsewhere within coherency domain 124 (recall FIG. 2), opcodes and data patterns may be written to on-chip cache memory 105 at frequencies and latencies approaching those supported by interconnect 104. In either case, frequencies and latencies achievable are vastly superior to those available for scans from off-chip test or I/O interfaces to locations in cache or other memory.

Figure 4:
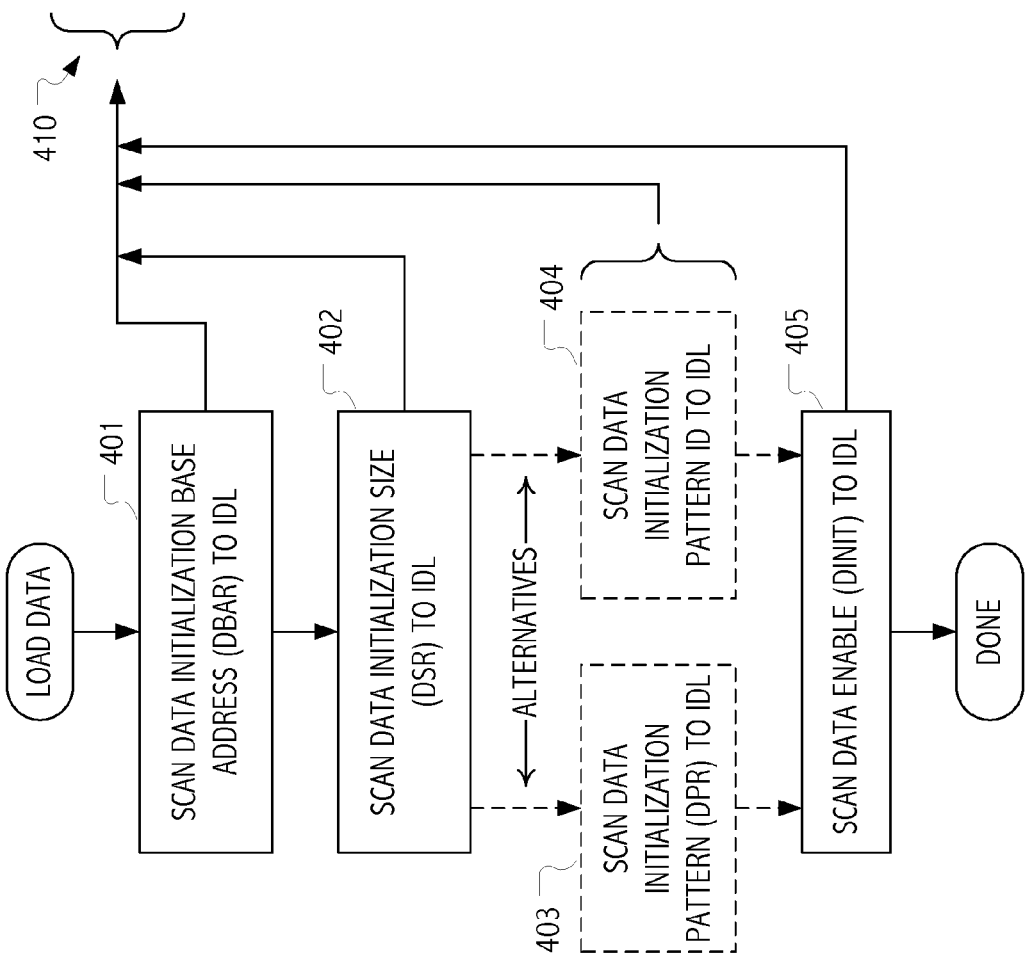
FIG. 4 is a flow chart that illustrates initialization of data for core functional patterns in accordance with some embodiments of the present invention.

FIG. 4 is a flow chart that illustrates initialization of data for core functional patterns in accordance with some embodiments of the present invention. To load data patterns, a test or debug facility scans (401) a data initialization base address (DBAR) to an instruction and data loader (e.g., to configuration registers 302 of IDL 107, recall FIG. 3). The test or debug facility further scans (402) a data initialization size (DSR) to the instruction and data loader. The test or debug facility scans to the instruction and data loader either (403) the data pattern (0x55555555) to a data initialization pattern register (DPR) or (404) a pattern identifier (or MODE) selective for the desired pattern from amongst a set of predefined values encoded on-chip (e.g., in non-volatile or power-on initialized storage or in fixed logic). Thereafter, the test or debug facility scans (405) a data initialization enable (DINIT) trigger to set in motion the previously described operations by which data pattern (0x55555555) is introduced at successive addressable locations 410 from 0x10000000 to 0x1FFFFFFC.

Figure 5:
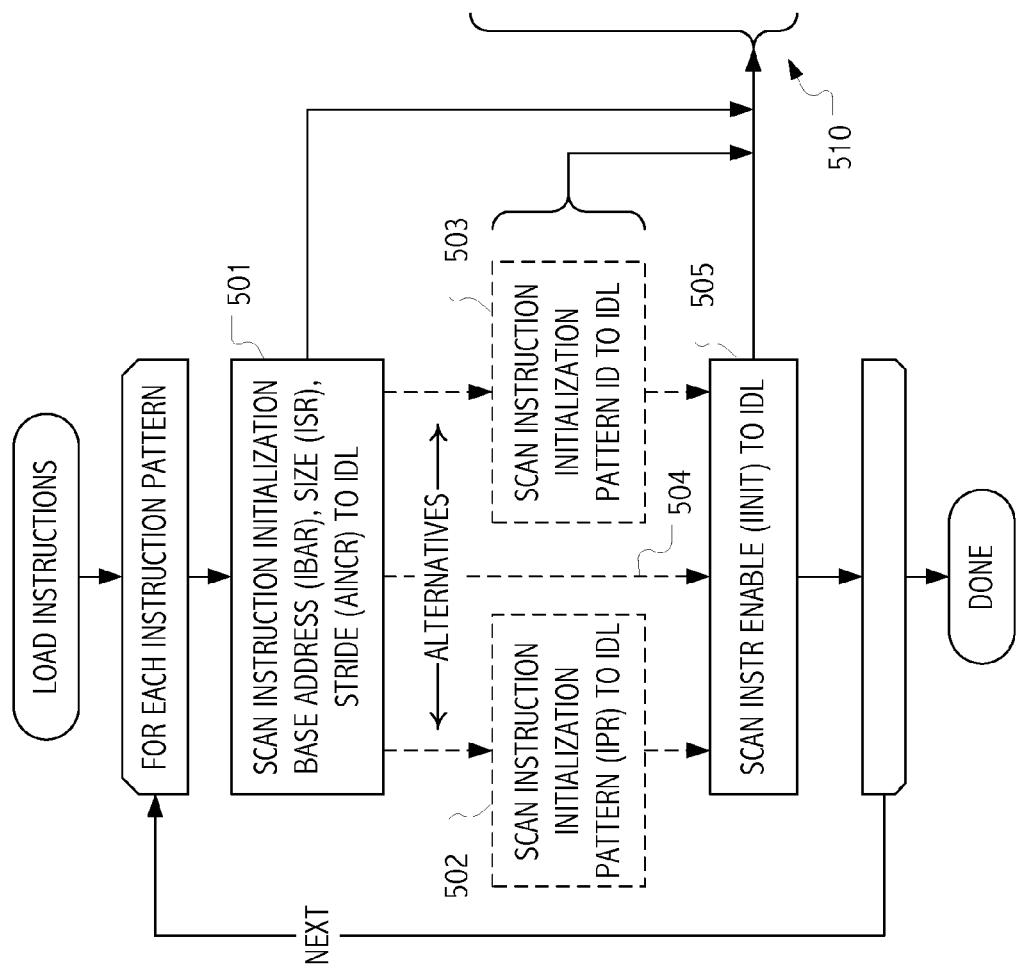
FIG. 5 is a flow chart that illustrates initialization of instructions for core functional patterns in accordance with some embodiments of the present invention.

FIG. 5 is a flow chart that illustrates initialization of instructions for core functional patterns in accordance with some embodiments of the present invention. To load opcode sequences, a test or debug facility scans (501) an instruction initialization base address (IBAR), an instruction initialization size (ISR) and an operant stride (AINCR) to an instruction and data loader (e.g., to configuration registers 302 of IDL 107, recall FIG. 3). Note that scans of individual values are depicted collectively merely for simplicity of illustration. As before, the test or debug facility scans to the instruction and data loader either (502) an opcode (e.g., for some sequences, 0x7DAD6B78) to a instruction initialization pattern register (IPR) or (503) a pattern identifier (or MODE) selective for the desired pattern from amongst a set of predefined values encoded on-chip (e.g., in non-volatile or power-on initialized storage or in fixed logic). Thereafter, the test or debug facility scans (405) an instruction initialization enable (IINIT) trigger to set in motion the previously described operations by which the selected opcode (here 0x7DAD6B78) is introduced at addressable locations 510 beginning at 0x00000300 and at successive 64-word strides (e.g., at 0x00000400, 0x00000500 . . . ) through addressable instruction memory.

In the illustrated flow, successive iterations through the scan setup (IBAR, ISR, IPR/MODE) and instruction initialization enable (IINIT) steps are used to introduce successive opcodes (e.g., opcode 0x4C000064 at instruction addresses 0x00000304, 0x00000404, 0x00000504 . . . ). Alternatively, in some embodiments, a predefined sequence of plural opcodes (e.g., the sequence {0x7DAD6B78, 0x4C000064 . . . } may be implicit (504) without regard to a scan selection of individual opcodes.

Other Embodiments

Although the invention is described herein with reference to specific embodiments, various modifications and changes can be made without departing from the scope of the present invention as set forth in the claims below. For example, while techniques have been described in the context of particular interconnect and system configurations, the described techniques have broad applicability to designs in which an instruction and/or data loader is used to introduce instruction and/or data patterns into addressable memory as constituents of a processor core functional pattern test.

Embodiments of the present invention may be implemented using any of a variety of different information processing systems. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, systems and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method of introducing processor core functional tests into an on-chip cache operatively coupled between a processor core of a system on a chip (SoC) integrated circuit and an interface to a memory addressable by the processor core, the method comprising:
scanning data pattern target and data pattern selection information from off-chip into respective fields of control registers;
scanning at least a first data pattern from off-chip into on-chip data pattern storage accessible by an on-chip loader;
scanning instruction target and opcode selection information from off-chip into second respective fields of the control registers; and
under control of the on-chip loader,
writing at least a first portion of a core functional test into the on-chip cache based on the data pattern target and the data pattern selection information scanned from off-chip, wherein the first portion of the core functional test includes at least the first data pattern scanned from off-chip,
writing at least a second portion of the core functional test into the on-chip cache based on the instruction target and instruction selection information scanned from off-chip, wherein the introduced second portion of the core functional test includes at least one opcode for execution by the processor core.

2. A method of introducing processor core functional tests into a memory space addressable by at least one processor core of a system on a chip (SoC) integrated circuit, the method comprising:
scanning data pattern target and data pattern selection information from off-chip into respective fields of control registers of an on-chip loader;

scanning at least a first data pattern from off-chip into on-chip data pattern storage accessible by the on-chip loader;

under control of the on-chip loader, writing data pattern information to a first set of plural data locations in the memory space addressable by the processor core, wherein the data patterns written and the written-to data locations of the first set are respectively selected based on the data pattern target and the data pattern selection information scanned from off-chip;

scanning at least instruction target and instruction selection information from off-chip into respective fields of the control registers of the on-chip loader; and under control of the on-chip loader, writing instructions to a second set of plural instruction locations in the addressable memory space, wherein the instructions written and the written-to instruction locations of the second set are respectively selected based on the instruction target and instruction selection information scanned from off-chip, wherein at least one of the selected data patterns corresponds to the first data pattern and is sourced from the on-chip data pattern storage, and wherein the functional tests introduced into the memory space addressable by the processor core include both the data patterns and instructions executable by the processor core.

3. The method of claim 2,
wherein the written-to data locations are in on-chip cache memory; and
wherein the on-chip loader is integrated with the on-chip cache memory.

4. The method of claim 2,
wherein at least a portion of the on-chip data pattern storage is provided within the control registers of the on-chip loader.

5. The method of claim 2,
wherein at least a second one of the data patterns selected and written to respective ones of the data locations is not scanned from off-chip, but rather is selected from a set of predefined data patterns persistently coded on-chip.

6. The method of claim 2, further comprising:
scanning at least a first instruction from off-chip into on-chip instruction pattern storage accessible by the on-chip loader,
wherein at least one of the selected instructions corresponds to the first instruction and is sourced from the on-chip instruction pattern storage.

7. The method of claim 2,
wherein at least a second one of the instructions selected and written to respective ones of the instruction locations is not scanned from off-chip, but rather is selected from a set of predefined instruction patterns persistently coded on-chip.

8. The method of claim 2,
wherein none of the instructions selected and written to respective ones of the instruction locations are scanned from off-chip, but rather each is selected from a set of predefined instruction patterns persistently coded on-chip.

9. The method of claim 2, wherein the instruction target information scanned in from off-chip specifies one of:
a base address in the memory address space and a size of the second set of instruction locations; and
a base address in the memory address space, a stride and a repeat count.

10. The method of claim 2, wherein the data pattern target information scanned in from off-chip specifies one of:
a base address in the memory address space and a size of the first set of data locations; and
a base address in the memory address space, a stride and a repeat count.

11. An apparatus comprising:
at least one processor core, the at least one processor core suitable for executing instruction sequences from, and addressing data in, memory;
an on-chip cache operatively coupled between the at least one processor core and an interface to the memory; and
an on-chip functional test loader coupled to introduce, based on data pattern target and data pattern selection information scanned from off-chip into respective fields of control registers, at least a first portion of a core functional test into the on-chip cache, wherein the introduced first portion of the core functional test includes at least a first data pattern scanned from off-chip into on-chip data pattern storage accessible by the on-chip functional test loader, the on-chip functional test loader coupled to further introduce, based on instruction target and instruction selection information scanned from off-chip into respective fields of control registers, at least a second portion of the core functional test into the on-chip cache, wherein the introduced second portion of the core functional test includes at least one opcode for execution by the processor core.

12. The apparatus of claim 11, further comprising:
content selection logic of the on-chip functional test loader, the content selection logic responsive to a data pattern selection field of the control registers; and
cache pointer logic of the on-chip functional test loader, the cache pointer logic responsive to one or more data pattern target fields of the control registers and to a state machine operable to advance a cache pointer to identify successive locations of the on-chip cache into which a selected data pattern is to be introduced.

13. The apparatus of claim 11,
the content selection logic selective from amongst plural data patterns including (i) the first data pattern scanned from off-chip into the on-chip data pattern storage and (ii) at least a second data pattern not scanned from off-chip, but rather selected from a set of predefined data patterns persistently coded on-chip.

14. The apparatus of claim 11,
wherein at least a portion of the on-chip data pattern storage is provided within the control registers of the on-chip loader.

15. The apparatus of claim 11, further comprising:
content selection logic of the on-chip functional test loader, the content selection logic responsive to an instruction selection field of the control registers; and
cache pointer logic of the on-chip functional test loader, the cache pointer logic responsive to one or more instruction target fields of the control registers and to a state machine operable to advance a cache pointer to identify successive locations of the on-chip cache into which a selected opcode is to be introduced.

16. The apparatus of claim 15,
the content selection logic selective from amongst plural opcodes, wherein at least one of the plural opcodes is not scanned from off-chip, but rather selected from a set of predefined opcodes persistently coded on-chip.

17. The apparatus of claim 11, further comprising:
an I/O interface suitable for communication of data pattern target, data pattern selection, instruction target and instruction selection information from off-chip to the functional test loader.

18. A method of introducing processor core functional tests into a memory space addressable by least one processor core of a system on a chip (SoC) integrated circuit, the method comprising:
scanning both data pattern targets and data pattern selections from off chip into first respective fields of control registers of an on-chip loader;
scanning both instruction targets and opcode selections from off chip into second respective fields of the control registers of the on-chip loader; and
under control of the on-chip loader, writing data patterns and opcodes to respective data and instruction locations in the addressable memory space,
wherein the data patterns written and the written-to data locations are selected based on the data pattern targets and the data pattern selections scanned from off-chip, and wherein the opcodes written and the written-to instruction locations are selected based on the instruction targets and opcode selections scanned from off-chip.

19. The method of claim 18,
wherein at least one of the data patterns selected and written to respective ones of the data locations is not scanned from off-chip, but rather is selected from a set of predefined data patterns persistently coded on-chip.

20. The method of claim 18,
wherein at least one of the opcodes selected and written to respective ones of the instruction locations is not scanned from off-chip, but rather is selected from a set of predefined opcodes persistently coded on-chip.

21. The method of claim 18,
wherein none of the opcodes selected and written to respective ones of the instruction locations are scanned from off-chip, but rather each is selected from a set of predefined opcodes persistently coded on-chip.

22. The method of claim 18, wherein the instruction targets scanned in from off-chip specify one of:
a base address in the memory address space and a size of the written-to instruction locations; and
a base address in the memory address space, a stride and a repeat count.

* * * * *